Jan. 13, 1959  R. R. DECOURT  2,869,114
AUTOMATIC PROCESS AND APPARATUS FOR INDICATING THE NECESSITY
OF READJUSTING THE LEVEL OF THE ELECTROLYTE
IN ACCUMULATORS OF AUTOMOTIVE VEHICLES
Filed Sept. 18, 1956  3 Sheets-Sheet 1

INVENTOR.
RALPHO R. DECOURT
BY
ATTORNEY

Jan. 13, 1959 R. R. DECOURT 2,869,114
AUTOMATIC PROCESS AND APPARATUS FOR INDICATING THE NECESSITY
OF READJUSTING THE LEVEL OF THE ELECTROLYTE
IN ACCUMULATORS OF AUTOMOTIVE VEHICLES
Filed Sept. 18, 1956 3 Sheets-Sheet 2
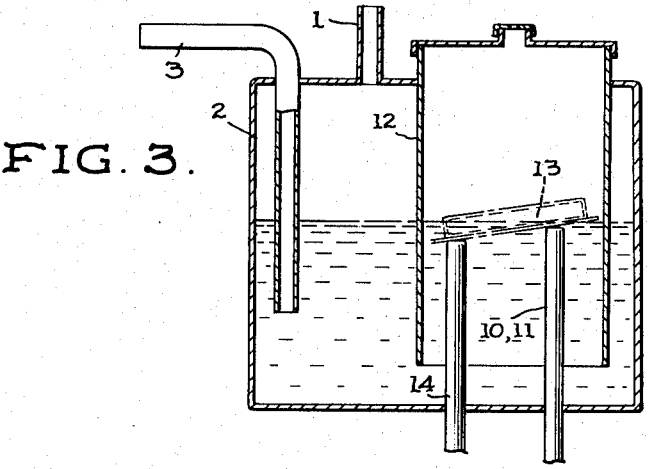
FIG. 3.
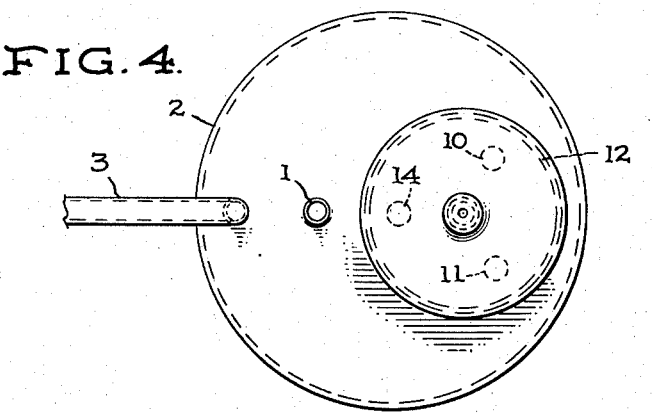
FIG. 4.
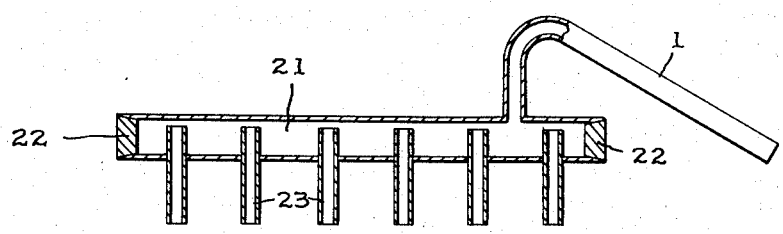
FIG. 5
INVENTOR.
RALPHO R. DECOURT
BY
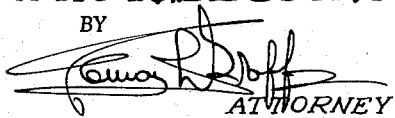
ATTORNEY FIG. 6.
FIG. 7.
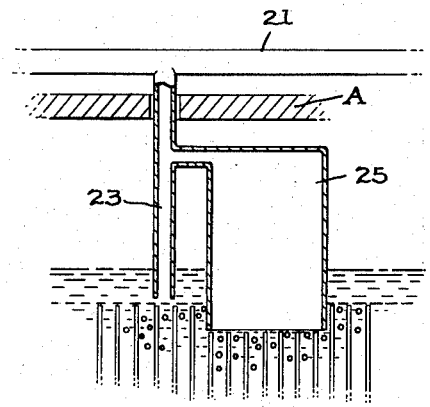
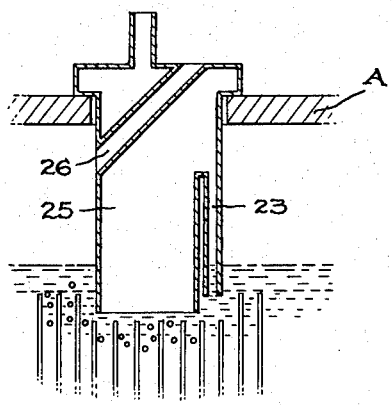
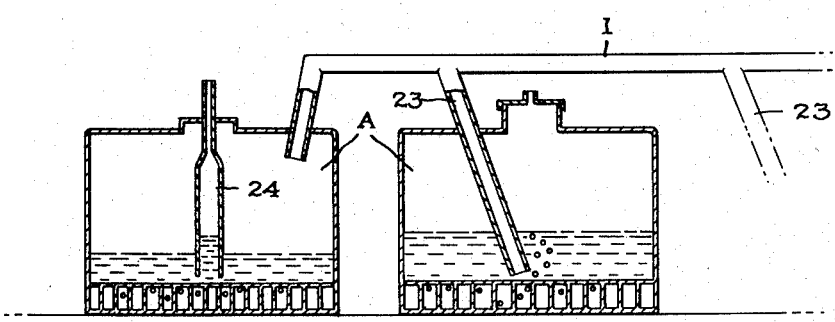
FIG. 8.
INVENTOR.
RALPHO R. DECOURT
BY
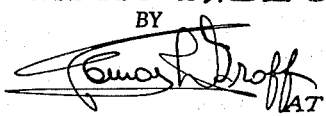
ATTORNEY United States Patent Office 2,869,114
Patented Jan. 13, 1959

2,869,114

AUTOMATIC PROCESS AND APPARATUS FOR INDICATING THE NECESSITY OF READJUSTING THE LEVEL OF THE ELECTROLYTE IN ACCUMULATORS OF AUTOMOTIVE VEHICLES

Ralpho Rezende Decourt, Rio de Janeiro, Brazil

Application September 18, 1956, Serial No. 610,573

Claims priority, application Brazil November 29, 1955

5 Claims. (Cl. 340—249)

The present patent application deals with a process and apparatus designed to provide the driver of a car, at his driving seat, with a warning that he should put more water in the battery, since the level of acid in same has reached the level of the insulating plates. It is a device designed to render easier the motorist's work of maintaining in good condition his car battery.

In order to render clearer the operation of the process and apparatus herein claimed and the utility of same we shall recall the following details pertaining to the construction of accumulators of the lead-sulphuric acid type: (1) the insulating plates are slightly larger than the active plates, in order to provide protection around same with regard to short-circuiting possibilities; (2) under normal operating conditions, the level of the acid solution exceeds by a few millimeters the level of the insulating plates; (3) the overlying layer of electrolyte, in operation, varies with the temperature, with the release of gas retained at submerged points and with the charged or discharged condition of the active plates; (4) said layer of liquid is also variously distributed over the plates in view of the position of the car when going up or down a slope, or at an angle on a curve, due to centrifugal action on the liquid; (5) simultaneously with the operation of the accumulator, there occurs a lowering of the level caused by electrolytical decomposition of the water, giving rise therefore to the necessity of periodically readjusting the level by the addition of distilled water, in order to prevent deterioration of the active plates; (6) said readjustment will have to be made with greater or lesser frequency in accordance with the factors involved; it should be pointed out that the lowering of the liquid level is not the same in all the cells of the battery; (7) one is therefore faced with the need of attention at the end of indeterminate periods of time; this the claimed process aims to specify, as regards time, by warning by means of a light signal the necessity of readjusting said level.

The apparatus herein claimed will therefore insure supervision of the variations in the level of the highly corrosive acid liquid, at the height of the insulating plates, within a zone of a few millimeters, indicating the need of adding water whenever one at least of the cells has reached a critical point. The invention does not utilize any metal contacts in the battery, capable of producing short circuits, or any floats which would not have sufficient space at their disposal. It rests on an entirely different principle which we shall now explain with the help of the attached drawings.

Better to explain the operation of the process and apparatus of the present invention we will now refer to the attached drawings, wherein:

Figs. 3 and 4 illustrate in longitudinal section and in plan, respectively, another embodiment of the apparatus according to another aspect of the invention using an external source of pressure.

Fig. 5 illustrates in longitudinal section a distributing connection or manifold for use of the apparatus with a six cell battery, and Figs. 6, 7 and 8 illustrate details of three different forms of the injector device of the apparatus.

Figure 1:
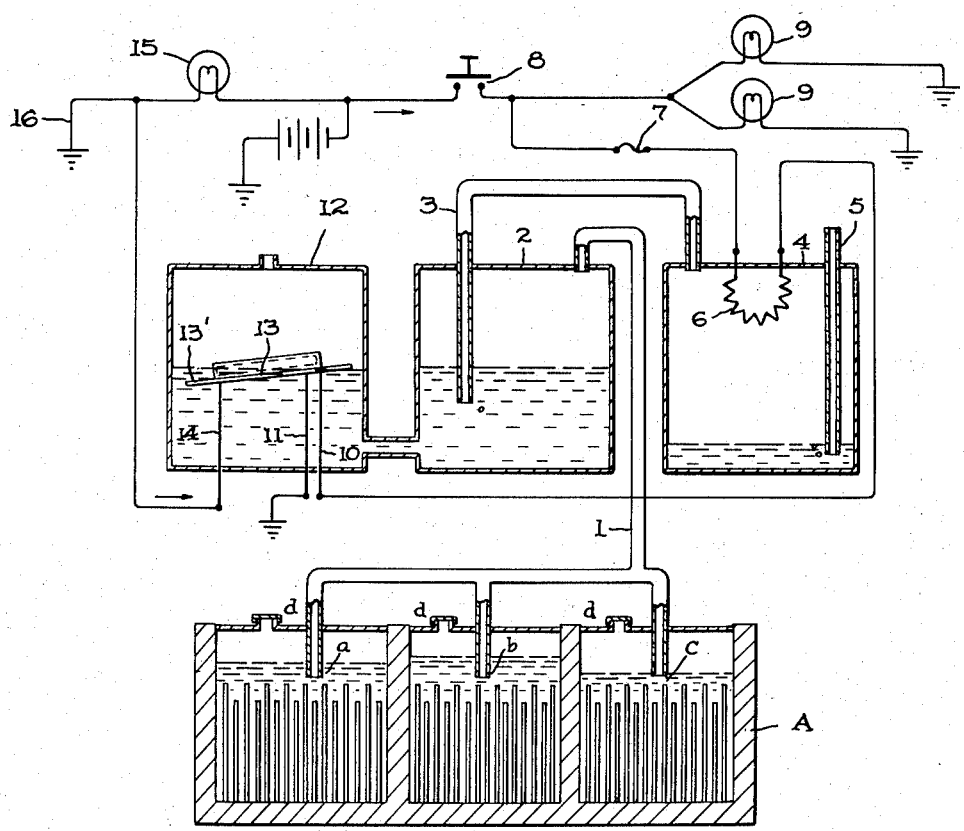
Fig. 1 illustrates diagrammatically a first embodiment of the apparatus of the present invention.

The drawings, especially Fig. 1, illustrate a three cell battery A equipped with the apparatus of the present invention comprising, fundamentally, a tube 1 the branches of which dip into the electrolyte of each of the cells and the other end of which leads into the upper part of a closed chamber 2 containing a non-evaporating liquid, such as oil. Into the liquid of said chamber there is immersed the end of a tube 3 which leads into the upper part of a second closed chamber 4 wherein there is also a non-evaporating liquid wherein dips a tube 5 open to the atmosphere. Within said chamber 4 lies an electric resistor 6 controlled, together with a fuse 7, by the switch 8 of the car tail lamps 9; in said circuit there is further included a second switch formed by two terminals 10, 11 immersed in the also non-evaporating liquid contained in a third chamber 12 in communication with the atmosphere.

As shown in the drawings, one of said terminals 10 is connected to one of the ends of resistor 6 and the other one leads to the car body, the contact being closed by means of a floating element having a lower metallic face 13 on a lowering of the level of liquid in chamber 12. When said level goes down still further, another circuit is closed to ground which may be the car body by means of a third and lower terminal 14, provided in chamber 12, said circuit controlling an alarm lamp 15 provided with an auxiliary switch 16 designed to allow the operator to check the perfect condition of said lamp, which is essential for the satisfactory operation of the apparartus.

Figure 2:
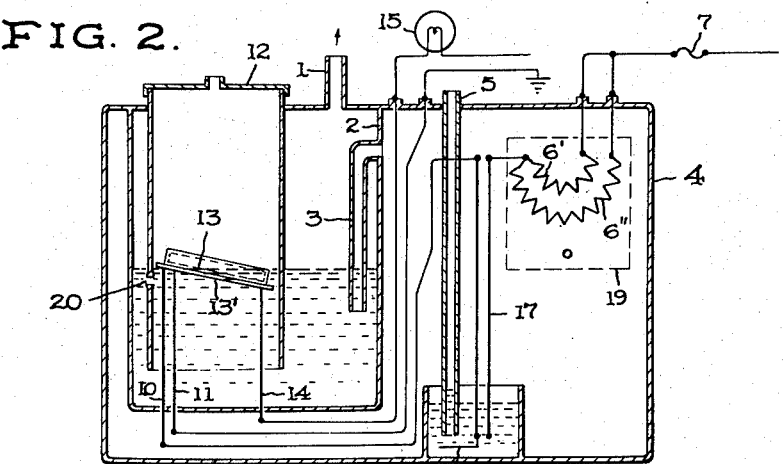
Fig. 2 illustrates also diagrammatically a second more compact and improved embodiment of said apparatus.

The present appratus the operation of which requires the parts shown diagrammatically in Figs. 1 and 2 is based on the fact that if a certain amount of air confined in 2 be prevented from expanding to the atmosphere, through branch 1, by the liquid contained in each of the cells of battery A the maximum possible pressure in 2 will be equal to the smallest layer of liquid at the ends $a$, $b$ and $c$ plus the small column due to capillarity, in accordance with the diameter of branch 1. Thus, if the layer be 3 mm. high and capillarity should amount to 2 mm., maximum pressure in 2 will be 5 mm., and an air bubble will rise at the top of the branch least immersed in the electrolyte, ready to bubble off on an increase of pressure. The provision of a slight pressure through sealing the plates with supernatant liquid is one of the main features of the process.

In order better to explain the operation, it should be pointed out that the ends 1 will immerge in the electrolyte (acid solution), touching the insulating plates in order to facilitate flow, and should be tubes a few millimeters in diameter and made of satisfactory electrically insulating material, capable of resisting the acid under normal operating conditions. Density of the acid is approximately 1.28. At a level of about half a centimeter below the insulating plates lie in alternation the lead and lead oxide plates constituting the poles of the cell. The liquid contained in 2 should be viscous, not volatile and of good electric insulating properties, conveniently a lubricating oil having a high S. A. E. value.

Any air blown into chamber 2, under the conditions above specified, will bubble off at one end of 1 and issue from dent $d$ of the corresponding cell, of the type provided in conventional batteries. Said intermittent or continuous injection of a small amount of air, obtained by any means whatsoever, is one of the basic requirements for the operation of the invention and, as shown in Fig. 1, is obtained by the injecting action of chamber 4 which sucks in air through tube 5 and injects same in 2 through tube 3, by heating. Admission of air through tube 5 occurs through cooling of chamber 4.

Heating, obtained by the red-hot temperature of resistor 6 occurs each time the motorist actuates the brake pedal closing switch 8 which controls the rear "stop" lights 9 provided in all cars.

Another non-electrical possibility for the injection of air or some other gas will be later herein referred to, as variations of the invention. Use of the brake rear (stop) lamp system for providing current for the injector is one of the features of the invention.

Air injected in 2 is not retained only when one at least of the ends of branch 1 is open, in other words, when in one of the cells the level has reached the insulating plates. Connection 1 controls simultaneously all the cells in the battery. However, when all the ends are closed said few millimeters pressure accumulates in 2 and switch 13 is then actuated, exerting an electrical control on the process.

Chamber 12 communicates at the bottom with chamber 2, so that the liquid existing in 12 will be the same as in 2. Above said liquid, in 12, pressure is atmospheric, so that the difference in level between 2 and 12 corresponds to the same few millimeters pressure existing along branch 1 or connection leading to the battery.

The receptacle 12 contains a liquid over which floats a light disk 13 which may be hollow or made of cork or similar material, the under face 13' of said disk being a metal foil capable of conducting electric current. Below said float 13 there are three symmetrically disposed terminals 10, 11 and 14, under the disk, designed to maintain same suspended when the level in 12 goes down too much, this being one of the basic points of the apparatus in the case of the electric injector (two electric circuits); terminal 14 is a few millimeters shorter than the other two which are of the same length. Said float assumes an inclined position when suspended from the three terminals. The metal foil 13' projects around the cork disk in order to prevent capillarity effects.

The shorter terminal 14 is included in the circuit starting from some point in the installation and including panel lamp 15, terminal 14, float metal disk 13' and terminal 11 to ground in the car body. Said circuit is energized when the difference in level between 2 and 12 is non-existent, in other words, when there is lack of water in at least one of the battery cells. Float 13 remains inclined and sustained and the lamp 15 is lit on the panel board.

The circuit passing through terminal 10 derives current from the "stop" lamp lead, beyond switch 8 and passes through fuse 7, resistor 6, terminal 10, metal float disk 13' of float 13 and terminal 11 back to ground on the car body. Said circuit is closed when the driver puts on the brakes and as the difference in level of liquid in chambers 2 and 12 is so small that the bottom of the float 13 does not exceed the level of the equal terminals 10 and 11. After one or two quick applications of the brake said level is attained and the circuit is broken, as long as there exists acid at all the ends of branch 1. Above said level the two circuits are opened, since contact between terminal 11 and float disk 13', common to both circuits, will be open.

The practical execution of the embodiment shown in Fig. 1 is illustrated in Fig. 2 as the assembly best designed to further the requirements of the process. Reference numbers in all the drawings correspond to the same parts, so that we have chamber 12 of the float 13 surrounded by the small pressure chamber 2 and the latter surrounded by chamber 4 which is the injector expansion chamber which houses resistor 6. This arrangement solves certain details such as those referred to the relative levels of 2 and 12 which are thus made to depend on the car inclination. Placing of terminal 14 approximately at center of 1, as shown in Figs. 3 and 4, since 2 and 12 are not concentric, also reduces the influence of car inclination on the operation of the switch in regard to the circuit of lamp 15. Surrounding of the assembly by chamber 4 leads to the manufacture of the apparatus as a shielded hermetically sealed casing, as required for the good operation of same.

The communications with the atmosphere—tube 5 and chamber 12—serve for the introduction of oil in the air admission bubbler and in the switch chamber respectively. Said openings serve also for the removal and cleaning of the float and of the electric contacts, all of them immersed in oil, and for regulating the switch level. Said means of access are protected by covers having a small orifice.

Fig. 2 further illustrates the following accessories which are not shown in Fig. 1: (1) the circuit of resistor 6 includes a thermo-regulator formed by a bimetallic electric contact 17 controlled at a temperature appropriate to the material used in the construction of the apparatus (60° C. for plastics) and designed to open the circuit in the event of a prolonged braking with no water in the battery, in other words, with resistor 6 heated for a long time. Contact of bimetallic blade operates immersed in the oil of the bubbling vessel of air admission; the strut of the bimetallic member has an arm 18 reachable by tube 5 together with a wire designed to engage the electric contact of the bimetallic member (in determining the cause of failure); (2) the resistor circuit is forked having thus two resistances in parallel, 6' and 6", a 6 volt and a 12 volt branch, each with an independent outlet, fed with current through fuse 7, in order to prevent risk of fire, in the case of plastics, the two resistors should be placed within a small metal casing 19 provided with an orifice for the inlet and outlet of air; (3) in order to prevent a great depression in chamber 2, due to excessive cooling, there should be an orifice 20 between 2 and 12, more or less at terminal 14, a strong cooling, without injector operation may promote dim lighting up of lamp 15 on the switching on of the main switch; one may thus test the lamp but this does not signify lack of water in the battery, the latter being indicated by persistent lighting, even with the brakes on; also in order to provide for the examination of the lamp there should be a branch with switch 16, also provided on the panelboard, closing a circuit directly to ground on the car body.

As for the manifold 21 for the internal connection of the apparatus and the connection of same with all the cells of the battery, it may comprise a manifold with branches or else various adjustable parts, including specially made plugs or covers; they may reach the level of the insulating plates through specially provided orifices on top of the battery or through the covers; they may be made of plastic, rubber or glass exclusively or in combination, in order that the branches entering the battery may not run the risk of short circuiting the active plates; the dimensions of the ends touching the plates should be such that, in view of the material used, the surface tension of the acid solution may permit the retaining of a drop at the end of the tube. One should prevent the establishment of a liquid contact between adjoining vessels through the acid accumulated in the connection and therefore the latter should be provided with enlargements or similar obstructions designed to prevent continuity of liquid connection between the vessels; the vent normally provided in the battery covers or plugs should be kept free of obstruction and should indeed be enlarged to prevent the formation of over-pressures; one may also provide additional vents. Installation of the branches should occur more or less at the mean position of the vessel, under a slight inclination to prevent splashing, exactly below the plug, in order to render without significance the influence of any car inclination occurring during curves or sharp brakings, even in the case of a minimum layer of acid.

Fig. 5 illustrates a manifold which provides a maximum of favorable conditions. Being made of plastic rigidly connected transparent parts, it comprises a manifold into which the branches 23 penetrate and reach beyond the wall 21, thus preventing the establishment of a liquid bridge between adjoining vesesls. There is a short branch 23 leading to each vessel and a long one 1 for connection with the apparatus proper; main tube 21 is closed at the ends by two small plugs 22, 22 which are useful for cleaning the connection and for breaking up the pressure whenever necessary to test the apparatus; fixation on the upper part of the battery results from the simple insertion of the branches 23 into sliding fit orifices provided on the side of the conventional plugs, said orifices being preferably inclined toward the central part of the vessel; the joints are made leak-proof with pitch, at the penetration points on top of the battery.

The apparatus herein described illustrates in substance the form better adapted to the object aimed at, however, within the basic principles already stated herein, it is capable of a series of alternatives which we shall now mention in connection with Figs. 6, 7 and 8, in order to include in the patent claims; (a) the injector may operate with heat derived from the motor and acting upon a small chamber placed at a distance from the apparatus proper; (b) it may operate through compression of an elastic (rubber) part or plunger actuated by hand or by means of pedals; (c) it may operate by the action of an air collector, collecting same on displacement of the car proper. Another series of alternatives for the injector might be embodied in the battery proper, although they would require special fabrication of same; (d) a small dome 25 mounted within the battery and placed over the electrolyte, see Fig. 6, same operating within a recess in the set of plates in order to constitute a small gasometer fed by the gases evolved from the liquid; said recess in the plates will provide the pressure necessary for the operation of the switch; there would be laterally a small level tube 23 normally immersed in the liquid, as described, until it touches the insulating plates; said gasometer 25 may or may not be provided in each vessel, the outlet tubes forming the switch connection being joined together; (e) said gasometer 25 might be mounted on the plug giving access to the battery, as in Fig. 7, within a recess, and be provided with a vent 26 and a level tube 23; the plug should have appropriate dimensions and the connecting parts should be capable of being disassembled or else be pressure fitted together; (f) one might transform one of the battery cells into a gasometer, Fig. 8, and within said vesesl, improvided with a vent, a large hydraulic trap 24 might pass through the plug, thus breaking down the pressure only in case of lowering of the electrolyte level; excess gases would escape through tubes 23 and the vents of the other vessels.

All the alternatives mentioned above, referring to the injector, require substantial modifications in the apparatus which would be reduced to the set of chambers 2 and 12, as shown in Figs. 3 and 4 which is a reproduction of part of Fig. 2, with the difference that the branch 3 issuing from the injector immerges in the liquid of the pressure chamber. The chief modification will be the substitution of a neutral support of same height for the terminal 10, since, in this case, there will only be one electric circuit, that of lamp 15. It should be noted that in any one of the above alternatives, the arrival of gas at the set of communicating vessels could be obtained by adapting the respective admission tube to branch 5 of Fig. 2. Switching off of the resistor electric circuit would render terminal 10 a neutral support.

As regards failures in the operation of the apparatus, failure of lamp 15 constitutes the greatest worry since it will deprive the motorist of the indication he needs. Other failures all lead to the lighting up of the lamp. When it is found that there is water in the battery it becomes necessary to localize the fault. Contacts lying below the float are well stimulated by the movements of the car.

Thus the installation as a whole comprises a casing wherefrom issue the electric connections and the tubular connection with the battery. Said casing should be placed near the battery at a point not subject to great heat, especially when made of plastic.

The fundamentals of all the alternatives are the three basic features of the process and apparatus, to wit; (1) the confining of air under limited pressure, retained by closing in the battery liquid in each of the cells of same; (2) the injection of a small volume of air or similar additional gas in order to maintain or readjust the pressure, subject to variations due to other factors; (3) the action of the light pressure gas on a switch formed by a floater-switch having a lower metal face and controlling the electric circuit or circuits of the apparatus.

The excentricity of the pressure chambers and float, Figs. 3 and 4, so that the shorter terminal may be centralized in regard to the liquid common to both chambers; the support of the float in a sloping position on two unequal inclined terminals; the dual resistors 6', 6'' and their lodgment in a metal casing to prevent contact with the plastic; the incidence of the inclined branches and the intense use of capillarity and surface tension which, together with the possible use of the battery gasses, also constitute features of the invention.

From the foregoing it will now be seen that alternative embodiments of the invention could be devised within the scope of the claims. Thus the apparatus could be deprived of its automaticity and disconnected from all and any of the car members (brakes), thereby acting by means of a separate switch which would connect the two circuits and thereby furnish indications only at the motorist's wish.

I claim:

1. Apparatus for indicating the necessity for readjusting the level of the electrolyte in the cells of a battery of an automotive vehicle, comprising, in combination, a first chamber containing an electrically insulating, viscous, non-volatile liquid, a second chamber containing an electrically, insulating, viscous, non-volatile liquid, means for connecting said chambers at their respective lower portions, whereby said respective liquids will mix and seek the same level in each of said chambers, said first chamber being hermetically sealed, said second chamber being open at a portion thereof to the atmosphere, a manifold having a plurality of branch pipes extending therefrom, each of said branch pipes extending into one of the cells of the battery and terminating below the electrolyte level at the insulating plates thereof and a tube connecting said first chamber thereto, whereby the pressure on the liquid in said first chamber is greater than atmospheric pressure by the pressure exerted by said electrolyte thereby causing a slight difference in the levels of the liquids in said first and second chambers, a third chamber containing an electrically insulating, viscous, and non-volatile liquid, means for connecting the air space of said third chamber with said liquid of said first chamber, a tube extending from the atmosphere into the liquid of the third chamber, a first electrical circuit and a second electrical circuit, said second circuit including an alarm lamp, said first circuit including a braking switch and an electrical heating resistor in series therewith, a floater switch means positioned on the surface of said liquid in said second chamber for closing said first circuit and then said second circuit, said electrical heating resistor being positioned in said third chamber, whereby, upon actuating the braking switch, the resistor heats the air in the third chamber and the air, on cooling, will cause air to flow from the atmosphere into the third chamber thereby causing the cool air to be injected into the first chamber and thence into the second chamber if the electrolyte levels in the cells are high enough or thence out of the branch pipe if any cell in which the electrolyte level is not high enough thus causing the floater switch means to close the second circuit and cause the alarm lamp to glow.

2. The apparatus of claim 1 wherein said first, second and third chambers are positioned outside of each other.

3. The apparatus of claim 1 wherein said first circuit includes two terminals insulated from and positioned in the liquid of said second chamber, said two terminals being equal in height, said second circuit including a third terminal insulated from and positioned in the liquid of said second chamber, said third terminal having a height slightly less than the height of said two terminals, and wherein said floater switch means includes a floating disk having a metallic lower portion and a means for supporting said lower portion.

4. The apparatus of claim 1 wherein said first chamber is positioned about said second chamber.

5. The apparatus of claim 3 wherein said first chamber is positioned about said second chamber and wherein said third and shortest terminal is positioned within said second chamber at approximately the center line of said first chamber.

References Cited in the file of this patent

UNITED STATES PATENTS 2,679,641     Liles _____ May 25, 1954